US010015360B1

(12) United States Patent
Kurzhanskiy et al.

(10) Patent No.: US 10,015,360 B1
(45) Date of Patent: Jul. 3, 2018

(54) IMAGE-BASED FIELD BOUNDARY DETECTION AND IDENTIFICATION

(71) Applicant: CLEARAG, INC., Santa Ana, CA (US)

(72) Inventors: Alex A. Kurzhanskiy, Albany, CA (US); John J. Mewes, Mayville, ND (US); Thomas N. Blair, San Francisco, CA (US); Dustin M. Salentiny, Grand Forks, ND (US)

(73) Assignee: CLEAR AG, INC., Santa Ana, CA (US)

( * ) Notice: Subject to any disclaimer, the term of this patent is extended or adjusted under 35 U.S.C. 154(b) by 0 days.

(21) Appl. No.: 15/948,260

(22) Filed: Apr. 9, 2018

Related U.S. Application Data

(63) Continuation of application No. 15/659,442, filed on Jul. 25, 2017, now Pat. No. 9,942,440.

(51) Int. Cl.
*G06K 9/00* (2006.01)
*H04N 1/387* (2006.01)
*G06T 11/60* (2006.01)
*G06T 5/00* (2006.01)

(52) U.S. Cl.
CPC ......... *H04N 1/3873* (2013.01); *G06K 9/0063* (2013.01); *G06T 5/002* (2013.01); *G06T 11/60* (2013.01)

(58) Field of Classification Search
None
See application file for complete search history.

(56) References Cited

U.S. PATENT DOCUMENTS

| 6,119,069 A | * | 9/2000 | McCauley | G06K 9/48 702/5 |
| 2015/0095336 A1 | * | 4/2015 | Green | G01S 5/0263 707/737 |
| 2016/0232621 A1 | * | 8/2016 | Ethington | G06Q 10/06315 |

* cited by examiner

*Primary Examiner* — Weiwen Yang
(74) *Attorney, Agent, or Firm* — Lazaris IP

(57) ABSTRACT

Detection and identification a field's boundaries is performed in a workflow based on processing images of the field captured at different times, relative to a defined seed point. Images are clipped to align with the seed point and a bounding box around the seed point, and a mask is built by extracting edges of the field from the images. The workflow floods an area around the seed point that has pixels of a similar color, using the mask as an initial boundary. The flooded area is compared to threshold parameter values, which are tuned to refine the identified boundary. Flooded areas in multiple images are combined, and a boundary is built based on the combined flooded set. Manual, interactive tuning of floodfill areas allows for a separate boundary detection and identification workflow or for refinement of the automatic boundary detection workflow.

36 Claims, 3 Drawing Sheets

IMAGE-BASED FIELD BOUNDARY DETECTION AND IDENTIFICATION

CROSS-REFERENCE TO RELATED PATENT APPLICATION(S)

This patent application claims priority to, and is a continuation of, U.S. non-provisional application Ser. No. 15/659,442, filed on Jul. 25, 2017, the contents of which are incorporated in their entirety herein. In accordance with 37 C.F.R. § 1.76, a claim of priority is included in an Application Data Sheet filed concurrently herewith.

FIELD OF THE INVENTION

The present invention relates to precision agriculture. Specifically, the present invention relates to a system and method for detecting field boundaries from one or more images of the same location, captured at different times, whether within the same season or over a period of time spanning multiple years, to support agronomic decision-making and data management associated with a particular farming entity.

BACKGROUND OF THE INVENTION

Applications, or 'apps', supporting the agronomic decisions and data management associated with production agriculture often require the delineation of fields as an initial step in setup of accounts associated with a particular farming entity. This process can be accomplished in any number of ways, but methodologies that are universally practical across the whole of the Earth are quite limited.

In some countries, such as the United States and countries within the European Union, governments have created GIS datasets of field boundaries, often as part of the administration of government programs supporting production agriculture. Though public access to these GIS datasets is sometimes limited, where they are made available they can substantially ease the process of field identification and associated boundary delineation. One significant problem with the use of such datasets, however, is that they require ongoing maintenance in order to be kept up-to-date with changing field boundaries. Field boundaries can change for any number of reasons, including changes of ownership, drainage activities, 'new breaking' of previously untilled ground or the return of farmed ground to pasture or native vegetation, human development, etc. This requires an ongoing commitment on the part of entities maintaining such GIS datasets in order to keep them current, and thus relevant.

Another option is to use GPS technology onboard agricultural equipment to acquire field boundary data. GPS-enabled autonomous equipment operation and data collection are becoming relatively ubiquitous in some of the more developed regions of the world. Where available, this data can provide highly accurate field boundary information that can be imported into software applications in order to ease the process of field setup, though the difficulties of exporting and importing these data between disparate software systems can be problematic. One drawback of this approach to field boundary setup is that boundary data is not often available for newly-acquired land, so that data must be acquired and then exported/imported as new fields are added, as well as when any changes are made to existing boundaries (which, as discussed earlier, can change quite regularly for any number of reasons).

In the absence of GIS datasets, the most common approach to field setup in agricultural applications is to provide users with georeferenced aerial imagery of their fields displayed in an interactive mapping engine, and then provide users with drawing tools by which they can draw the boundaries of fields by tracing out features evident in the aerial imagery or other reference imagery that is provided. However, the manual nature of this up-front process, in combination with the ever-increasing size of farms globally, can be a substantial deterrent to onboarding and acceptance of potentially valuable applications.

Given these issues, a new approach to automating or aiding field boundary detection, identification, and maintenance would be welcomed within the global agricultural industry. Perhaps the most promising approaches are based on the idea that field boundary information can be automatically detected from aerial imagery of farmland. Such imagery has become ubiquitous with the surge in satellite-based 'Earth sensing' platforms in recent years. These satellite-based systems can provide multi-spectral imagery of locations across the entirety of the Earth with revisit intervals presently measured in days to weeks. The impending explosion in the use of micro-satellites and remotely-piloted vehicles (commonly referred to as drones) for the collection of imagery and other remotely-sensed data will only serve to make imagery-based approaches to field boundary detection more appealing going forward.

Successful algorithm development to-date has nonetheless been limited by a number of real-world problems that make field boundaries difficult to identify. In-field variability in crop health owing to any number of causes, many of which may be transient, can create apparent (but false) boundaries within a single field. Further, the same crops are often growing in neighboring fields, at similar growth stages, and with similar spectral signatures that are not easily differentiable in remotely-sensed data. This can make it impossible to detect where one field ends and the next begins.

BRIEF SUMMARY OF THE INVENTION

The ever-lengthening history of remotely-sensed multi-spectral imagery provides a possible solution to the problems described. Given a series of images of the same location, captured at different times, whether within the same season or potentially over a period spanning multiple years, techniques can be applied to combat some of the aforementioned difficulties with image-based field boundary detection algorithms. With a series of images collected over time, the probability that neighboring fields have hosted crops that are differentiable from one another at one or more points in time increases substantially. Further, transient in-field variability owing to the impacts of weather and soil conditions become more easily separable from the relatively static true boundaries of the field. The workflow and processes described herein seek to take advantage of these facts in order to achieve a more robust automatic imagery-based field boundary identification algorithm.

The present invention includes a workflow for accurately detecting and identifying a field's boundaries. One embodiment of such a workflow provides an automated approach that processes images of a field and fills around a seed point, using a mask as an initial boundary that is based on edges extracted from the images. Several mathematical operations are performed that clip and smooth the images to be analyzed, build the mask, flood the area whose boundary is to be determined, refine the initial flood by tuning floodfill parameters, and compute the actual boundary. In another embodiment of such a workflow, a manual approach interactively allows a user to refine the boundary detection and identification process by identifying points that are inside and outside a bounding box around the seed point. Yet another embodiment of such a workflow is a combination of these automated and manual approaches.

It is therefore one objective of the present invention to provide a system and method of detecting and identifying a field boundary from one or more images using a defined seed point. It is another objective of the present invention to automatically detect and identify the field boundary by processing one or more images, using a plurality of mathematical techniques that include a floodfill operation. It is yet another objective of the present invention to detect and identify the field boundary using a manual process of evaluating one or more images of the field that includes interactively tuning the floodfill operation. It is a further objective of the present invention to refine automatic field boundary detection and identification using the interactive process of refining the floodfill operation.

In one aspect, the present invention is a method of detecting and identifying a boundary of a field, comprising defining positional coordinates of a seed point in a particular field, and a first bounding box around the seed point, obtaining one or more images that include the first bounding box around the seed point, clipping the one or more images so that pixels in each image in the one or more images refer to positional coordinates of the first bounding box, building a mask for a boundary of the particular field by identifying one or more edges of the particular field from the one or more images, filling an area around the seed point and within the mask that has pixels of a similar color to pixels representing the seed point in each image in the one or more images, checking the filled area around the seed point by a) defining a second boundary box for the filled area, b) determining whether threshold parameter values representing upper and lower distances from a pixel brightness of the seed point are satisfied in the second boundary box for the filled area, and c) tuning the threshold parameters values where the pixel brightness is outside the threshold parameter values to adjust the filled area, combining, for each image, the filled area into a combined flooded set, computing a boundary around the combined flooded set, and translating the boundary in the combined flooded set to positional coordinates in the particular field.

In another aspect, the present invention is a method, comprising identifying 1) a seed point representing a particular field, and 2) a bounding box around the seed point, the bounding box having a plurality of threshold parameters defining a pixel brightness relative to pixels representing the seed point, and one or more images of the particular field that include bounding box and the seed point, analyzing the input data in a plurality of data processing modules within a computing environment in which the plurality of data processing modules are executed in conjunction with at least one processor, the data processing modules configured to detect and identify a boundary of the particular field, by modifying the one or more images so that pixels in each image in the one or more images refer to positional coordinates of the bounding box, detecting one or more edges of the particular to create a mask for a boundary of the particular field, performing a floodfill operation to flood an area around the seed point within the mask, that has pixels of a similar color to pixels representing the seed point in each image in the one or more images, comparing pixel brightness of the flooded area with the plurality of threshold parameters, and tuning values in the plurality of threshold parameters representing upper and lower distances from a pixel brightness of the seed point where the pixel brightness exceeds the values to adjust the size of the flooded area, creating a combined flooded set from the flooded areas in each image, applying an alpha-shape operation to build a boundary around the combined flooded fill set. The method includes generating, as output data, a set of positional coordinates representing the boundary of the particular field.

In still another aspect, the present invention is a system comprising a computing environment including at least one computer-readable storage medium having program instructions stored therein and a computer processor operable to execute the program instructions to perform an image-based field boundary detection in a particular field within a plurality of data processing modules, the plurality of data processing modules including a data identification component configured to determine 1) a seed point representing a particular field, and 2) a bounding box around the seed point, the bounding box having a plurality of threshold parameters defining a pixel brightness relative to pixels representing the seed point, an image retrieval component, configured to obtain one or more images of the particular field that include bounding box and the seed point, and a plurality of data processing modules configured to detect and identify a boundary of the particular field based on the seed point from the one or images, the plurality of data processing modules configured to modify the one or more images so that pixels in each image in the one or more images refer to positional coordinates of the bounding box, detect one or more edges of the particular to create mask for a boundary of the particular field, perform a floodfill operation to flood an area around the seed point that has pixels of a similar color to pixels representing the seed point in each image in the one or more images, compare pixel brightness of the flooded area around the seed point with the plurality of threshold parameters, and tuning values in the plurality of threshold parameters representing upper and lower distances from a pixel brightness of the seed point where the pixel brightness exceeds the values to adjust a size of the flooded area, create a combined flooded set from the flooded areas in each image, and apply an alpha-shape operation to build a boundary around the combined flooded fill set. The system includes a translation module configured to generate a set of positional coordinates representing the boundary of the particular field.

Other objects, embodiments, aspects, features, and advantages of the present invention will become apparent from the following description of the embodiments, taken together with the accompanying drawings, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention, reference is made to the exemplary embodiments illustrating the principles of the present invention and how it is practiced. Other embodiments will be utilized to practice the present invention and structural and functional changes will be made thereto without departing from the scope of the present invention.

The present invention is a workflow for accurately detecting and identifying a boundary of a field. This workflow is performed in one or more systems and methods of field boundary detection and identification that processes one or more images of the same location, captured at different times, and whether within the same season (such as for example a current growing season or time of year, i.e. winter, spring, summer or fall) or over a period of time spanning multiple years, and generates one or more outputs to support agronomic decision-making and data management associated with a particular farming entity in precision agriculture.

In one embodiment, a system(s) and method(s) of field boundary detection of the workflow is configured to automatically process the one or more images of the field to identify the field's boundaries from at least one seed point. In another embodiment, a system and method of field boundary detection of the workflow is configured to identify field boundaries from at least one seed point by a manual process of interactively identifying field points that are inside or outside the actual boundary. In yet another embodiment, the workflow may combine the automatic and manual approaches that manually corrects the automatically-calculated field boundaries where the automatic boundary identification does not satisfy the user.

Figure 1:
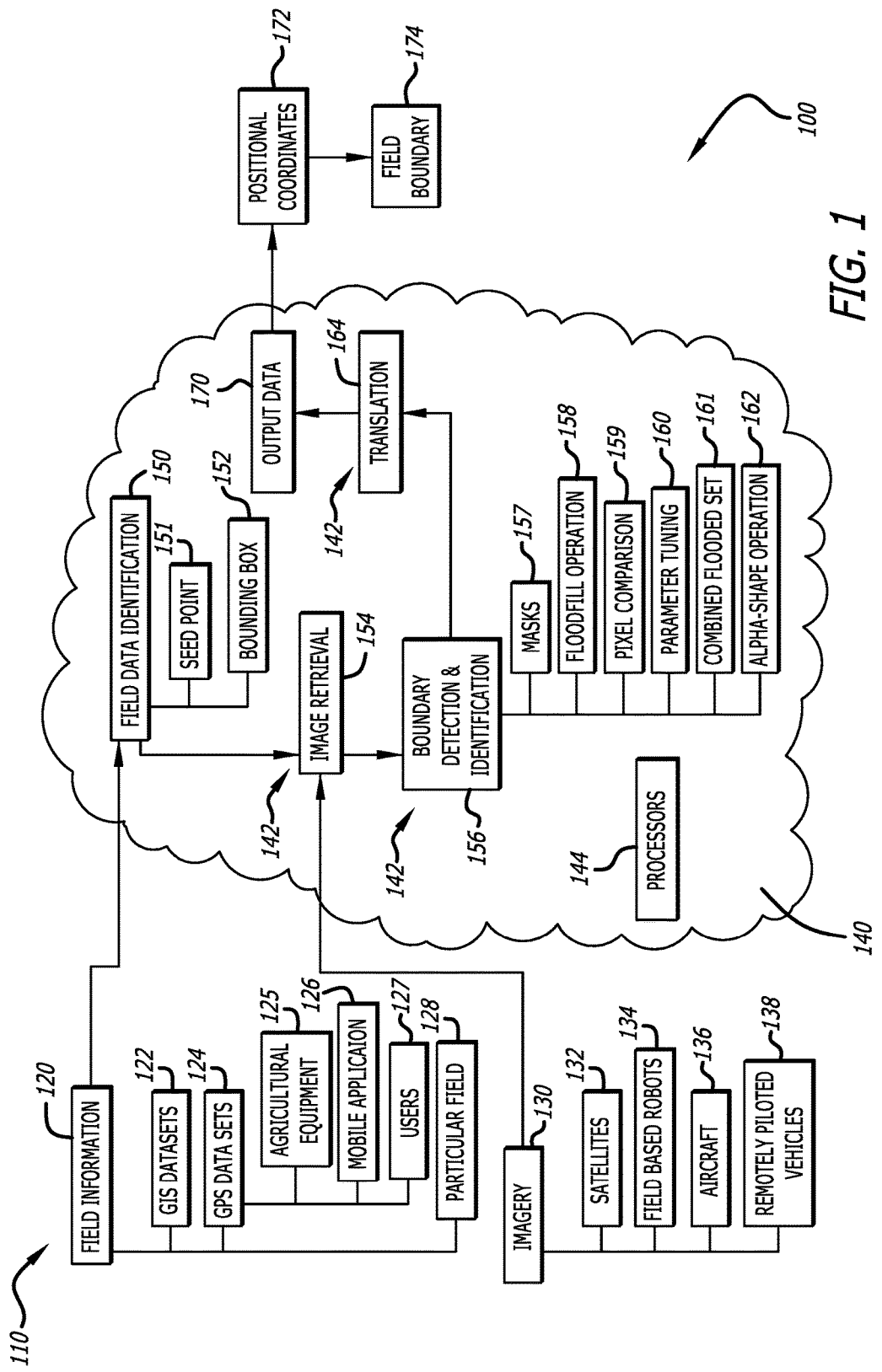
FIG. 1 is a block diagram illustrating components in a field boundary detection and identification workflow according to the present invention.

FIG. 1 is a systemic block diagram of a workflow 100 for detecting and identifying a field's boundary according to the present invention. In this workflow 100, input data 110 that includes field information 120 and imagery 130 is ingested, received, requested, or otherwise obtained as described herein. Field information 120 includes both information contained in datasets from geographical information systems (GIS) 122 and geographical positioning systems (GPS) 124. GPS datasets 124 may be obtained in a number of ways for use in the workflow 100, for example from agricultural equipment 125, from mobile applications 126, and from users 127 directly. Imagery 130 includes one or more images that are obtained from a variety of different sources, for example satellites 132, field-based robots 134, aircraft, 136, and remotely-piloted vehicles 138.

The workflow 100 is performed at least in part by applying this input data 110 to one or more data processing components 142 within a computing environment 140 that also includes one or more processors 144, a plurality of software and hardware components, and one or more modular software and hardware packages configured to perform specific processing functions. The one or more processors 144, plurality of software and hardware components, and one or more modular software and hardware packages are configured to execute program instructions or routines to perform algorithms for various functions of the workflow 100 described herein, and embodied in the one or more data processing components 142.

The data processing components 142 include a data identification component 150, which is configured to ingest, receive, request, or otherwise obtain the field information 120. The data identification component 150 is also configured to determine a seed point 151 representing a particular field 128, and a bounding box 152 around the seed point 151. The bounding box 152 is represented by a plurality of threshold parameters defining a pixel brightness relative to pixels representing the seed point 151. The seed point 151 may be represented as positional coordinates within the field 128, and may be automatically selected or selected by a user. The data processing components 142 also include an image retrieval component 154, which is configured to obtain imagery 130 of the particular field 128 that includes the seed point 151 and the bounding box 152.

The data processing components 142 further include a boundary detection and identification component 156. This component 142 is configured to perform a pixel analysis of the imagery 130 to determine a boundary 174 of the particular field 128 based on the seed point 151 within the one or more images comprising imagery 130. The boundary detection and identification component 156 modifies one or more images in the imagery 130 so that pixels in each image refer to positional coordinates of the bounding box 152, and detects one or more edges of the particular field 128 to create a mask 157 for a boundary 174 of the particular field 128.

The boundary detection and identification component 156 also performs a floodfill operation 158 to flood an area around the seed point 151 that has pixels of a similar color to pixels representing the seed point 151 in each image, and then analyzes pixel characteristics 159 by comparing pixel brightness of the flooded area around the seed point 151 with a plurality of threshold parameters. The boundary detection and identification component 156 then performs a parameter adjustment 160 by tuning values in the plurality of threshold parameters representing upper and lower distances from a pixel brightness of the seed point 151 where the pixel brightness exceeds the values to adjust a size of the flooded area.

The boundary detection and identification component 156 further creates a combined flooded set 161 from the flooded areas in each image, and applies an alpha-shape operation 162 to build a boundary 174 around the combined flooded fill set 161. The present invention then applies the outcome of this analysis to a translation component 164, which is configured to generate output data 170 from which positional coordinates 172 of a boundary 174 of the field 128 are determined. Then, the workflow 100 generates the boundary 174.

Figure 2:
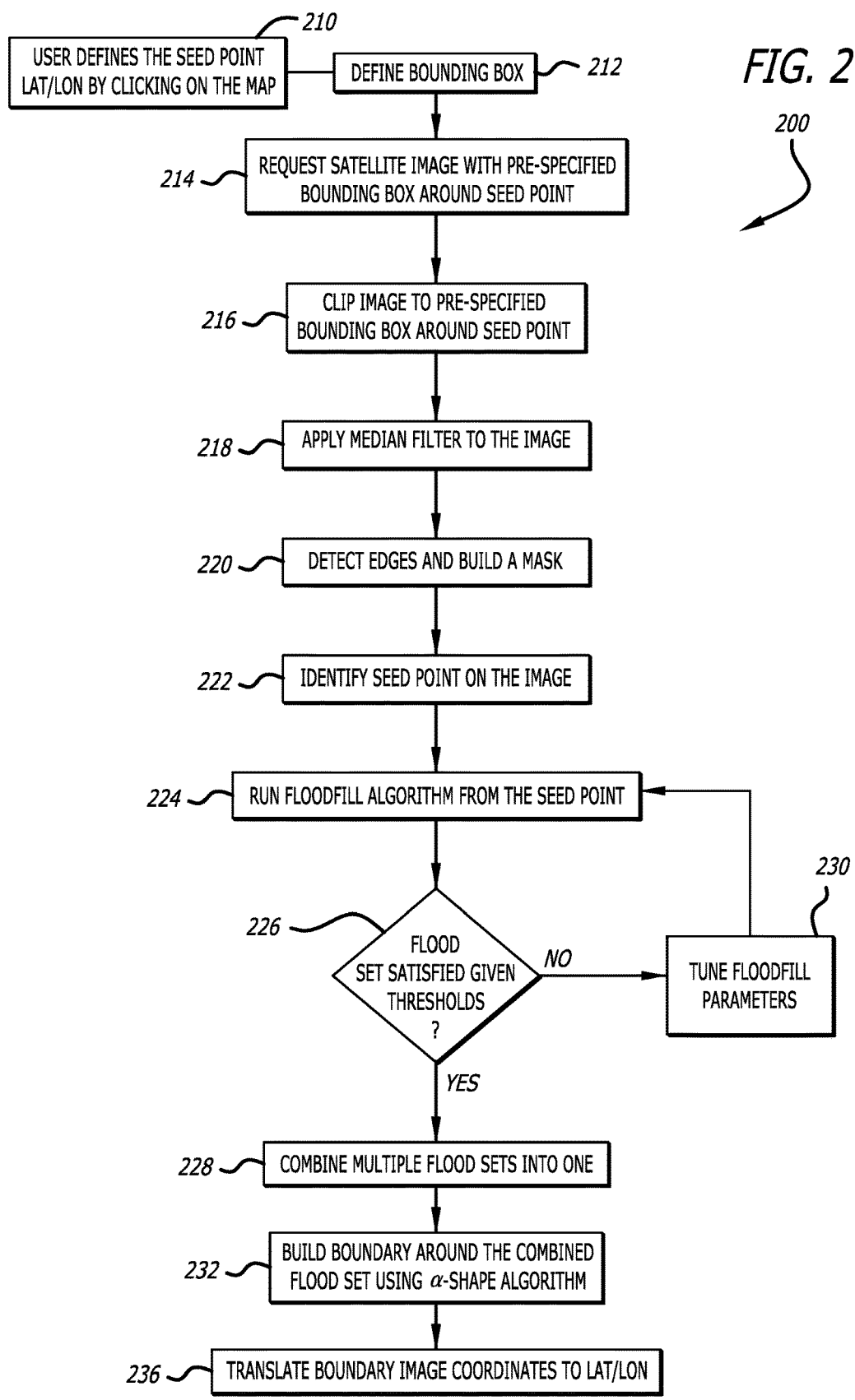
FIG. 2 is a flowchart of steps in a process of performing the field boundary detection and identification workflow according to one embodiment of the present invention.

As noted above, in one embodiment of the present invention, the field boundary detection workflow 100 includes automatically analyzing imagery 130 of a field 128 to identify its boundary 174. A boundary identification and detection process 200 for performing this workflow 100 is presented in the flow diagram of FIG. 2.

The boundary identification and detection process 200 begins with definition of at least one seed point 151 at step 210, which is a location identified by a latitude/longitude pair (lat/lon positional coordinates) within an actual field 128. The location of a seed point 151 may be obtained in a number of different ways. One such way is from positional coordinates of a place in the field 128 in datasets 124 obtained from GPS devices associated with a user 127 (for example, where a user is standing or present in the field) or other GPS systems, such as those associated with agricultural equipment 125 or mobile applications 126. The data used to define the positional coordinates representing a seed point 151 may also be obtained from a screen tap or mouse click on a geo-referenced satellite image (if, for example, a screen on a computer/tablet/mobile computing device is being used). The seed point 151 may also be obtained from an external dataset of latitude/longitude pairs representing at least one point in each field 128 to be mapped, for example in GIS datasets 122.

After a seed point 151 has been defined, the workflow 100 then defines a bounding box 152 that is likely to contain the field 128 in question at step 212, given the latitude/longitude pair of the at least one seed point 151. One way to accomplish this is to set the bounding box 152 as, e.g., +/−0.05 degrees latitude and +/−0.05 degrees longitude from the at least one seed point 151. It is to be understood that other approaches, or other lat/lon offsets, may be applied as well.

Once the seed point 151 and bounding box 152 have been defined, imagery 130 from images taken from satellites 132 or in aerial photos that contain the specified bounding box 152 are obtained and processed at step 214. These can be downloaded or otherwise acquired from many sources. Possible image sources include, but are not limited to Landsat (available at http://lansat.usgs.gov), commercial sources such as GeoEye, Quickbird, BlackBridge, etc., commercial satellite tiles, such as MapQuest, MapBox, Bing, etc., and government program compliance photography, such as that collected by the USDA's Farm Service Agency (FSA).

Where images are obtained from Landsat, one advantage of Landsat imagery is that it provides multiple images of the same areas taken over many months and years. One advantage of commercial satellite tiles is that they can be quickly downloaded, for different zoom levels, for most locations around the globe. Regardless, imagery 130 may be obtained from any type of satellite 132 configured to obtain images having an appropriate resolution, such as fine temporal resolution low-earth orbit satellites. Images may also be obtained, as noted above, from photography or video captured, for example, by remotely-piloted vehicles 136, commonly referred to as drones, or field-based robots 134 configured to generate field-level imagery 130, for example using in-field sensors. Manned and unmanned aerial reconnaissance craft 138 may also be used to acquire imagery 130 of a field 128 for processing within the workflow 100 of the present invention.

If multiple images containing the defined bounding box 152 are available, they may need to be clipped or modified so that the pixels with the same position on all the images are aligned to refer to the same lat/lon pair at step 216. This may be done so that the images aligned to refer to the same area, for example for different images of the same area taken at different times.

Alternatively, images may be built from satellite tiles for a specified zoom level. The workflow 100 may also create an average image out of multiple real images by computing average pixel color, for example where multiple tiles are provided from different sources. It should be noted that other types of composite and/or filtered images may be useful as well.

When working with satellite tiles, zoom levels 13, 14 and 15 in the Web Mercator coordinate system that has become more or less universal to web-based mapping engines are adequate for the field boundary detection and identification workflow 100 within the present invention. The table below provides specification of these zoom levels.

| Zoom Level | Meters per Pixel | Scale |
|---|---|---|
| 13 | 19.093 | 1:70,000 |
| 14 | 9.547 | 1:35,000 |
| 15 | 4.773 | 1:15,000 |

The higher the zoom level, the more precise the resultant boundary identification. However, processing of higher resolution images demands more computational power and time. Images with zoom level 13 are processed significantly faster than those with zoom level 14. However, in some cases resolution of level 13 is not sufficient to place a boundary correctly, such that the identified field shrinks (or expands) more than necessary.

The workflow 100 may also include using a smoothing or noise reduction technique at step 218 to eliminate small-scale noise, where needed. This may be done using a method that does not destroy boundaries between differently-colored areas. A filtering technique such as a median filter is one tool that may be used in such a smoothing step 218, although it is to be noted that other filtering techniques in signal processing may also be applied.

The present invention may also include applying an edge detection operator on available images. Detected edges may be used as barriers for a floodfill operation 158 described further below. One example of such an operator is the Canny edge detector algorithm. Extracted edges are used to build a mask 157 at step 220 for the floodfill operation 158 to restrict the extent of the floodfill. For this edge detection step 220, one may use not just the imagery 130 itself, but other map tiles, e.g. those containing (but not limited to) road shapes, rivers and other bodies of water. Moreover, when map tiles with roads and other relevant shapes are used, one may extract edges at different zoom levels and then translate them to masks 157 corresponding to satellite images used, whether they come from satellites 132 such as Landsat or created from satellite tiles.

Images are usually either geo-referenced images (e.g. geo-TIFFs), and tiles are standard 256×256 satellite tiles in the Web Mercator projection. Where this is the case, the workflow 100 translates that lat/lon coordinates of the seed point 151 to the pixel position in the image in step 222. When dealing with geoTIFFs, libraries are available for such a translation (for example, GDAL). If working with satellite tiles, formulae exist for converting between lat/lon and tile indices with pixel position (for example, http://wiki.openstreetmap.org/wiki/Slippy_map_tilenames, https://msdn.microsoft.com/en-us/library/bb259689.aspx, etc.).

The process 200 continues by performing the floodfill operation 158 mentioned above in step 224. This floodfill operation 158 applies one or more well-known flood-filling techniques that find the area around the seed point 151 that has similar pixel color to that of the seed point 151. The floodfill operation 158 may be performed with the mask 157 generated from the edges detected as described above. The white lines in the mask 157 are used as barriers for the floodfill operation 158; once the flood reaches the barrier, it stops there. Well-constructed masks 157 are therefore useful for preventing excessive flooding.

The present invention may implement a step 226 to check if the resulting flooded area has reasonable dimensions. One way of accomplishing this is to determine a special bounding box for the flooded area, and then check whether the height and width of this special bounding box fall within certain thresholds. If they do, the flood set may be considered satisfactory and the process 200 continues by generating a combined flood sets 161 coming from the different images into a single flood set in step 228 as described below. If they do not fall within certain thresholds, a feedback loop for tuning floodfill parameters 160 may be applied at step 230.

Tuning floodfill parameters 160 involves analyzing pixel characteristics 159, for example by comparing pixel brightness of the flooded area around the seed point 151 with a plurality of threshold parameters. The floodfill parameters 160 may be referred to as high and low, as they represent upper and lower distances from the brightness of the seed point 151. Image pixels from around the seed point 151 whose brightness in the three bands (red, green and blue) falls between these high and low bounds are considered similar to the seed point 151. In a monochrome example of what is meant by falling within bounds, 3 represents the brightness of the seed point 151, points with brightness 2 and 4 are considered similar to the seed point 151, but points with brightness 1 are not. The larger the high and low bounds are set, the more aggressive the floodfill will be. High and low bounds are tuned in the feedback loop at step 230, where the size (width and height) of the special bounding box of the flooded area serves as feedback. It is to be noted that high and low bounds are independent control variables.

The above steps of performing the floodfill operation 158 at step 224, checking the resulting flooded area at step 226 to ensure it has reasonable dimensions, and performing the feedback loop at step 230 are repeated until the size of the flood bounding box is evaluated as satisfactory (within the high and low bounds).

Once the floodfill operation 158 is complete, the field boundary detection process has satisfactory flood sets coming from different images. These need to be combined into a single flooded set 161 at step 228. In one example of combining flooded sets 161, four flood sets (flood 1, 2, 3 and 4) come from four satellite images. Recall that the same pixel represents the same location on all the images. Now, for every pixel in a given image, the workflow 100 assigns a value of +1 if it was flooded, and a value of −1 otherwise. This is done for each image with its own flood set. So, for each image, there is a matrix of 1 s and −1 s. At this point it is possible to sum up the elements of these matrices to get an integer-valued matrix of the same size. One may select a threshold ≥V and consider only pixels corresponding to entries of the resulting matrix that are to be part of the combined flooded set 161.

Once the single combined flood set 161 is determined, the boundary 174 can be computed. One technique for accomplishing this is to use an α-shape operation 162 from computational geometry to shape a finite set of points, in step 232. This operation is based on a Delaunay triangulation, and the value 1/α defines the minimum of the circumcircle radii of Delaunay triangles. The larger the value of a, the finer the detail in the boundary. With α→0 the boundary tends to the convex hull of the given set of points.

The resulting boundary 174 is stored as a multi-polygon, where each polygon consists of one external and zero or more internal boundaries. Image coordinates of the boundary pixels are converted to lat/lon pairs at step 234 using the inverse procedure of the one described above for translating the lat/lon of the seed point 151 to the pixel position in the image.

Knowing the seed points 151 for multiple fields, the process 200 can be invoked for bulk processing of field boundaries 174. As noted above, the workflow 100 builds a mask 157 that imposes restrictions on the floodfill operation 158. This is the basic mask, and the basic mask will be used as a basis for all other masks 157 that are generated in the process of manual boundary tuning described below. In other words, to obtain an augmented mask 157, the workflow 100 takes the basic mask and adds some additional features.

Figure 3:
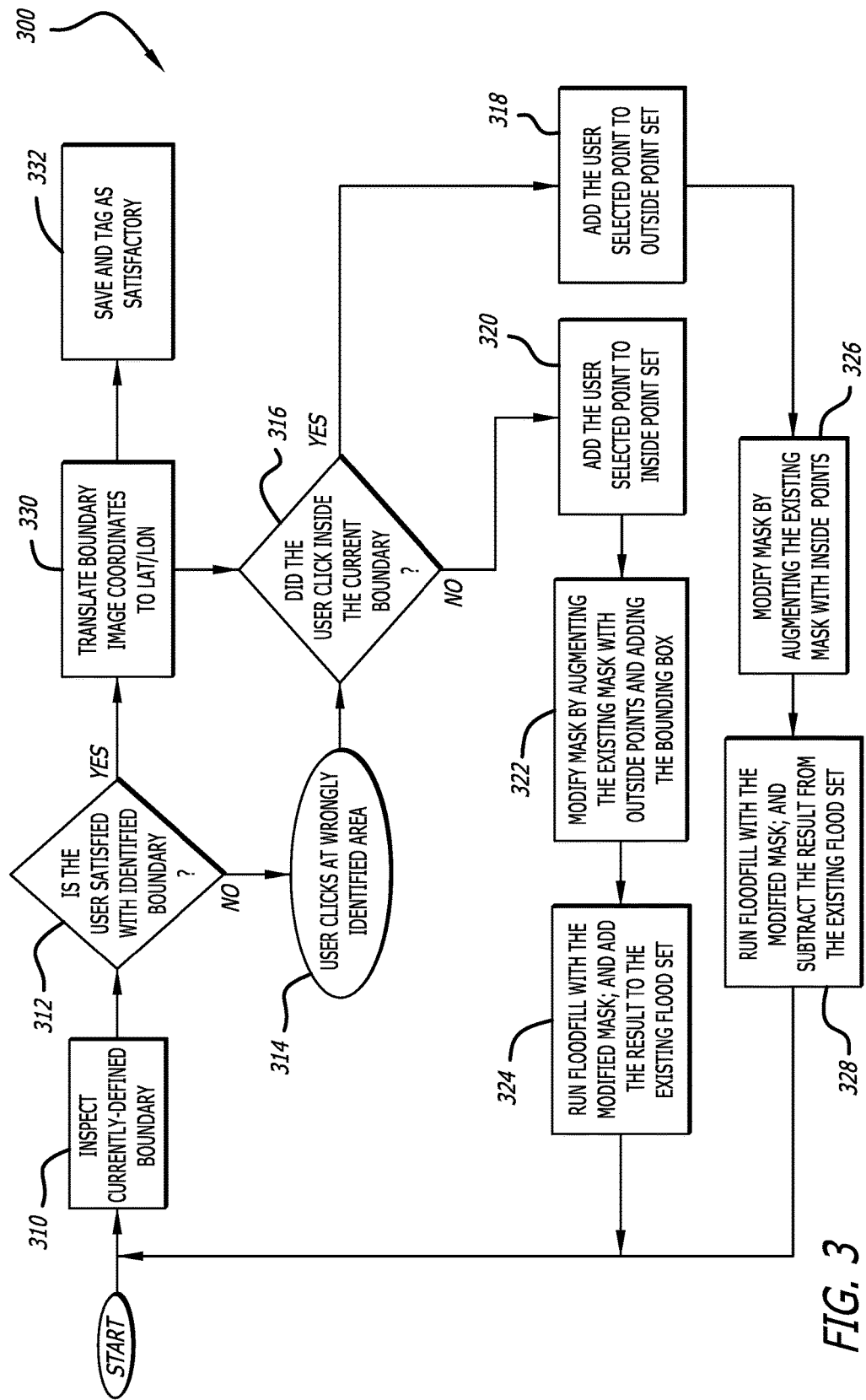
FIG. 3 is a flowchart of steps in a process of performing the field boundary detection and identification workflow according to another embodiment of the present invention.

In another embodiment of the present invention, the field boundary detection workflow 100 includes manually processing imagery 130 of a field 128 to identify its boundary 174 by interactively tuning one or more parameters. A boundary identification and detection process 300 for performing this workflow 100 is presented in the flow diagram of FIG. 3.

The end result of the automatic boundary identification process 200 discussed above with regard to FIG. 2 may not satisfy the user, in which case the user may want to correct the calculated field boundaries 174 manually. The present invention therefore includes a manual, interactive process for this purpose. Note that the workflow 100 of this embodiment does not require any prior attempts to automatically detect the field boundary 174 as described above in the automatic field boundary detection process 200. Therefore, it can be used as a standalone technique for detecting a field boundary 174.

The interactive process 300 according to this embodiment begins with inspecting the currently-defined boundary 174 of a given field 128 at step 310. If the user is not satisfied with the currently-defined boundary 174 at step 312, he or she selects the incorrectly identified area at step 314. This can be either (1) an area that failed to be included into the field 128, or conversely, (2) an area falsely included in the field 128. In the first case the user would click outside, and in the second case inside, the currently-defined boundary 174. The present invention processes one user selection (for example, using a mouse click) at a time recalculating the field boundary 174 as a result. Before proceeding with this step, however, the user may want apply the median smoothing described above.

In order to interpret these selections (mouse clicks), it is necessary to determine whether the user clicked inside or outside of the boundary 174 at step 314 by checking if the pixel the user clicked on belongs to the set of internal points. The set of internal points is populated by the unbounded (high and low bounds set to infinity) floodfill operation 158 initiated at a known internal point, with the current boundary 174 used as a mask 157. If the clicked point is inside at step 316, it indicates user belief that it should actually be outside the field 128—so, this point is added to the OUTSIDE set at step 318, which contains all the points that are not supposed to belong to the field 128. Otherwise the clicked point is outside the current boundary 174 at step 316, but the user believes it should actually belong to the field 128—so, this point is added to the INSIDE set at step 320, which contains all the points that are supposed to belong to the field 128.

The set of all points that should be inside the field boundary 174 is maintained, and this set is called INSIDE. The INSIDE set contains at least one element—the original seed point 151. Any point from the INSIDE set may be used in to initiate the unbounded floodfill operation 158. If the point the user clicked on is outside the current boundary 174, it is understood that it should actually be inside. Thus, it is added to the INSIDE set.

At this point a new mask 157 can be created by adding all the OUTSIDE points and a bounding box 152 to the existing mask 157 at step 322. The bounding box 152 is calculated based on the distance of the user-clicked pixel to the existing boundary 174. It may be that this pixel lies inside the bounding box 152 defined for the current boundary 174, but outside the current boundary 174. If this is the case the present invention uses that bounding box 152. If, on the other hand, the user-clicked point is outside the bounding box 152 defined for the current boundary 174, then this bounding box 152 can be inflated proportionally to the distance from the user-clicked point to itself.

Next, the present invention performs the floodfill operation 158 at step 324, using the clicked point as the seed 151, with the augmented mask 157 created in the previous step. The flood set is updated by adding new flood points to it. In this step 324 the user can also adjust the high and low bounds of the floodfill operation 158 to regulate the extent of the flood.

It should be noted that the floodfill operation 158 may be performed on several images (if multiple images are available). These multiple flooded areas may then be combined, as was done above in the automatic field boundary detection and identification process 200 described above.

As noted above, if the user clicked inside the currently-detected field boundary 174, this is an indication that the area selected should not belong to the field 128. The set of all points that should be outside the field boundary 174 is maintained at step 318, and this set is called OUTSIDE. The OUTSIDE set (as opposed to the INSIDE) may be empty. If the point the user clicked on is inside the current boundary 174, we understand that it should actually be outside. Thus, it is added to the OUTSIDE set.

The present invention proceeds by creating a new augmented mask 157 at step 326 by adding the INSIDE points to the basic mask. The present invention then initiates the floodfill operation 158 at step 328, using the clicked point as the seed point 151, with the newly-augmented mask 157. As mentioned above, instead of a basic floodfill, it is possible to run this operation on multiple available images and then combine the resulting flooded areas into one, as was done in the automatic field boundary detection and identification process 200. Thus, new flood points are obtained, which are subtracted from the previous flood set, so that all points in the previous flood set that also happen to be among the new flood points are removed from the previous flood set. The user can then adjust the high and low bounds in the floodfill parameters to regulate the extent of the flood.

These steps may be repeated until the user is satisfied with the result.

The workflow 100 then converts image coordinates of the boundary points to lat/lon pairs, as is also done with the automatic field boundary detection and identification process 200. If the user is satisfied with this detected field boundary 174 at step 330, the boundary is tagged as satisfactory at step 332. Tagged field boundaries 174 may be used later in the development of masks 157 supporting boundary identification in adjacent fields.

When the present invention analyzes fields 128 to detect and identify their boundaries 174, the workflow 100 and processes 200 and 300 described above learn certain knowledge as they proceed. Every time the user is finished with the boundary detection and identification for a given field 128 (in other words, achieving a satisfactory result), the following information is recorded:

Boundary 174 of the field 128, which is added to the basic mask, thus enhancing it for when the next field 128 is processed;

Smoothing factor (see median smoothing of the automatic field boundary detection and identification process 200 described above) used on the satellite tiles comprising the image used. When these tiles are used again for some other field, the same smoothing factor can be used;

If the user worked with just one satellite image out of multiple images available, then this image may be marked as the preferred one. This image will be suggested as the first choice to the user when processing adjacent fields; and High and low bounds of the floodfill operation 158.

Once recorded, these parameters may be suggested to the user when processing adjacent fields 128.

The knowledge learned from recording such information enables the present invention to suggest operational parameters for more accurate detection and identification of a boundary 174 of a field 128 as images of the field at different times are processed, within a machine learning component configured to continually analyze input data 110 in one or more layers of artificial intelligence at least for building a mask 157, performing the floodfill operation 158, analyzing pixel characteristics 159, and adjusting floodfill parameters 160. The present invention contemplates that many different types of artificial intelligence may be employed within the scope thereof, and therefore, the one or more layers of artificial intelligence may include one or more of such types of artificial intelligence. The one or more layers of artificial intelligence may apply techniques that include, but are not limited to, k-nearest neighbor (KNN), logistic regression, support vector machines or networks (SVM), and one or more neural networks. Regardless, the use of artificial intelligence in the workflow 100 of the present invention enhances the utility of field boundary detection and identification by automatically and heuristically constructing appropriate relationships, mathematical or otherwise, between variables to accomplish the task of determining field boundaries 174.

A field boundary identification and detection support tool may be incorporated within the present invention. Such a tool may be configured to enable customized user operation and selection of various attributes for performing the workflow 100, such as input and/or selection of one or more of the variables, as well as available imagery 130. The field boundary identification and detection support tool includes a user interface, and pull-down menus on such an interface (or in web-based or application-based modules to customize the input data 110, as well as to modify performance of the workflow 100 such as for example by interactively tuning or adjusting floodfill parameters 160 and analyzing pixel characteristics 159 as noted above. In addition to desktop, laptop, and mainframe computing systems, users may access the field boundary identification and detection support tool using applications resident on mobile telephony, tablet, or wearable computing devices.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of detecting and identifying a boundary of one or more zones of a field, comprising:
    defining positional coordinates of a seed point within one or more zones of a particular field, and a first bounding box around the seed point, from a plurality of images over time that include the first bounding box around the seed point;
    identifying pixels in each image of the plurality of images that have a similar color to pixels representing the seed point, the pixels in each image of the plurality of images that have a similar color to the pixels representing the seed point representing a transient in-field variability of one or more conditions between the one or more zones of the particular field;
    building a mask for a boundary of the one or more zones by identifying one or more edges from the plurality of images based on the transient in-field variability of the one or more conditions;
    filling an area around the seed point and within the mask that has pixels in each image of the plurality of images that have a similar color to pixels representing the seed point;
    checking the filled area around the seed point by a) defining a second boundary box for the filled area and representing a specific zone within the particular field having a specific condition, b) determining whether threshold parameter values representing upper and lower distances from a pixel brightness of the seed point are satisfied in the second boundary box for the filled area, and c) tuning the threshold parameters values where the pixel brightness is outside the threshold parameter values to adjust the filled area;
    combining, for each image, the filled area into a combined flooded set for the specific zone within the particular field;
    determining a boundary for the specific zone from the combined flooded set; and
    identifying the one or more conditions between the one or more zones in the particular field from the plurality of images taken over time, and generating a report of the transient in-field variability for each specific zone in the particular field.

2. The method of claim 1, further comprising translating the boundary in the combined flooded set to positional coordinates for each specific zone in the particular field.

3. The method of claim 1, further comprising separating the particular field into a plurality of management zones based on the transient in-field variability identified within the plurality of images of the particular field.

4. The method of claim 3, further comprising inferring one or more of crop, vegetation, soil, or field conditions of each management zone in the plurality of management zones within the particular field from the combined flooded fill set, and classifying each management zone by the one or more of crop, vegetation, soil, or field conditions.

5. The method of claim 1, clipping the plurality of images so that the pixels in each image in the plurality of images refer to positional coordinates of the first bounding box.

6. The method of claim 1, wherein the plurality of images are obtained from at least one of satellites, field-based robots, aircraft, and remotely-piloted vehicles over time.

7. The method of claim 1, wherein the plurality of images represent the same location captured at different times, over a period of time spanning either a current season or over multiple years.

8. The method of claim 7, further comprising creating an average image from the plurality of images by computing average pixel color, and smoothing each image to eliminate small-scale noise.

9. The method of claim 1, further comprising interactively tuning the boundary in the combined flooded set by selecting a wrongly-filled area in the plurality of images, and determining whether the wrongly-filled area is inside the boundary.

10. The method of claim 9, further comprising creating an augmented mask with one or more points known to be inside the actual boundary where the wrongly-filled area is inside the boundary and the wrongly-filled area is maintained as outside an actual boundary, re-filling the area around the seed point using the augmented mask, and subtracting a re-filled combined flooded set from the existing combined flooded set, and calculating a revised boundary of the particular field.

11. The method of claim 9, further comprising creating an augmented mask with one or more points known to be outside the actual boundary, where the wrongly-filled area is outside the boundary and the wrongly-filled area is maintained as inside an actual boundary, and the method, re-filling the area around the seed point using the augmented mask, and adding a re-filled combined flooded set to the existing combined flooded set, and calculating a revised boundary of the particular field.

12. The method of claim 9, further comprising straightening the boundary by one or more of selecting two different boundary points, and selecting a position near the boundary.

13. A method, comprising:
retrieving input data that includes a plurality of images representing one or more zones of a particular field taken over time;
analyzing the input data in a plurality of data processing modules within a computing environment in which the plurality of data processing modules are executed in conjunction with at least one processor, the data processing modules configured to:
define positional coordinates of a seed point within one or more zones of a particular field, and a first bounding box around the seed point, from a plurality of images over time that include the first bounding box around the seed point,
identify pixels in each image of the plurality of images that have a similar color to pixels representing the seed point, the pixels in each image of the plurality of images that have a similar color to the pixels representing the seed point representing a transient in-field variability of one or more conditions between the one or more zones of the particular field,
build a mask for a boundary of the one or more zones by identifying one or more edges from the plurality of images based on the transient in-field variability of the one or more conditions,
fill an area around the seed point and within the mask that has pixels in each image of the plurality of images that have a similar color to pixels representing the seed point,
check the filled area around the seed point by a) defining a second boundary box for the filled area and representing a specific zone within the particular field having a specific condition, b) determining whether threshold parameter values representing upper and lower distances from a pixel brightness of the seed point are satisfied in the second boundary box for the filled area, and c) tuning the threshold parameters values where the pixel brightness is outside the threshold parameter values to adjust the filled area,
combine, for each image, the filled area into a combined flooded set for the specific zone within the particular field,
determining a boundary for the specific zone from the combined flooded set; and
identify the one or more conditions between the one or more zones in the particular field from the plurality of images taken over time; and
generating, as output data, a report of the transient in-field variability for each specific zone in the particular field.

14. The method of claim 13, further comprising translating the boundary in the combined flooded set to positional coordinates for each specific zone in the particular field.

15. The method of claim 13, further comprising separating the particular field into a plurality of management zones based on the transient in-field variability identified within the plurality of images of the particular field.

16. The method of claim 15, further comprising inferring one or more of crop, vegetation, soil, or field conditions of each management zone in the plurality of management zones within the particular field from the combined flooded fill set, and classifying each management zone by the one or more of crop, vegetation, soil, or field conditions.

17. The method of claim 13, clipping the plurality of images so that the pixels in each image in the plurality of images refer to positional coordinates of the first bounding box.

18. The method of claim 13, wherein the plurality of images are obtained from at least one of satellites, field-based robots, aircraft, and remotely-piloted vehicles over time.

19. The method of claim 13, wherein the plurality of images represent the same location captured at different times, over a period of time spanning either a current season or over multiple years.

20. The method of claim 19, further comprising creating an average image from the plurality of images by computing average pixel color, and smoothing each image to eliminate small-scale noise.

21. The method of claim 13, further comprising interactively tuning the boundary in the combined flooded set by selecting a wrongly-filled area in the plurality of images, and determining whether the wrongly-filled area is inside the boundary.

22. The method of claim 21, further comprising creating an augmented mask with one or more points known to be inside the actual boundary where the wrongly-filled area is inside the boundary and the wrongly-filled area is maintained as outside an actual boundary, re-filling the area around the seed point using the augmented mask, and subtracting a re-filled combined flooded set from the existing combined flooded set, and calculating a revised boundary of the particular field.

23. The method of claim 21, further comprising creating an augmented mask with one or more points known to be outside the actual boundary, where the wrongly-filled area is outside the boundary and the wrongly-filled area is maintained as inside an actual boundary, and the method, re-filling the area around the seed point using the augmented mask, and adding a re-filled combined flooded set to the existing combined flooded set, and calculating a revised boundary of the particular field.

24. The method of claim 21, further comprising straightening the boundary by one or more of selecting two different boundary points, and selecting a position near the boundary.

25. A system, comprising:
a computing environment including at least one computer-readable storage medium having program instructions stored therein and a computer processor operable to execute the program instructions to perform an image-based field boundary detection of one or more areas in a particular field within a plurality of data processing modules, the plurality of data processing modules including:
an image retrieval component configured to retrieve input data that includes a plurality of images representing one or more zones of a particular field taken over time;
a plurality of data processing modules configured to:
define positional coordinates of a seed point within one or more zones of a particular field, and a first bounding box around the seed point, from a plurality of images over time that include the first bounding box around the seed point,
identify pixels in each image of the plurality of images that have a similar color to pixels representing the seed point, the pixels in each image of the plurality of images that have a similar color to the pixels representing the seed point representing a transient in-field variability of one or more conditions between the one or more zones of the particular field, build a mask for a boundary of the one or more zones by identifying one or more edges from the plurality of images based on the transient in-field variability of the one or more conditions, fill an area around the seed point and within the mask that has pixels in each image of the plurality of images that have a similar color to pixels representing the seed point, check the filled area around the seed point by a) defining a second boundary box for the filled area and representing a specific zone within the particular field having a specific condition, b) determining whether threshold parameter values representing upper and lower distances from a pixel brightness of the seed point are satisfied in the second boundary box for the filled area, and c) tuning the threshold parameters values where the pixel brightness is outside the threshold parameter values to adjust the filled area, combine, for each image, the filled area into a combined flooded set for the specific zone within the particular field, determining a boundary for the specific zone from the combined flooded set; and identify the one or more conditions between the one or more zones in the particular field from the plurality of images taken over time; and a reporting module configured to generate a report of the transient in-field variability for each specific zone in the particular field.

26. The system of claim 25, further comprising an output data module configured to translate the boundary in the combined flooded set to positional coordinates for each specific zone in the particular field.

27. The system of claim 25, further comprising an output data module configured to separate the particular field into a plurality of management zones based on the transient in-field variability identified within the plurality of images of the particular field.

28. The system of claim 27, further comprising an output data module configured to infer one or more of crop, vegetation, soil, or field conditions of each management zone in the plurality of management zones within the particular field from the combined flooded fill set, and classify each management zone by the one or more of crop, vegetation, soil, or field conditions.

29. The system of claim 25, wherein the plurality of data processing modules are further configured to clip the plurality of images so that the pixels in each image in the plurality of images refer to positional coordinates of the first bounding box.

30. The system of claim 25, wherein the plurality of images are obtained from at least one of satellites, field-based robots, aircraft, and remotely-piloted vehicles over time.

31. The system of claim 25, wherein the plurality of images represent the same location captured at different times, over a period of time spanning either a current season or over multiple years.

32. The system of claim 31, wherein the plurality of data processing modules are further configured to create an average image from the plurality of images by computing average pixel color, and smooth each image to eliminate small-scale noise.

33. The system of claim 25, wherein the plurality of data processing modules are further configured to interactively tune the boundary in the combined flooded set by selecting a wrongly-filled area in the plurality of images, and determining whether the wrongly-filled area is inside the boundary.

34. The system of claim 33, wherein the plurality of data processing modules are further configured to create an augmented mask with one or more points known to be inside the actual boundary where the wrongly-filled area is inside the boundary and the wrongly-filled area is maintained as outside an actual boundary, re-fill the area around the seed point using the augmented mask, and subtract a re-filled combined flooded set from the existing combined flooded set, and calculate a revised boundary of the particular field.

35. The system of claim 33, wherein the plurality of data processing modules are further configured to create an augmented mask with one or more points known to be outside the actual boundary, where the wrongly-filled area is outside the boundary and the wrongly-filled area is maintained as inside an actual boundary, re-fill the area around the seed point using the augmented mask, and add a re-filled combined flooded set to the existing combined flooded set, and calculate a revised boundary of the particular field.

36. The system of claim 33, wherein the plurality of data processing modules are further configured to straighten the boundary by one or more of selecting two different boundary points, and select a position near the boundary.

* * * * *